United States Patent
Kim et al.

(10) Patent No.: US 9,871,647 B2
(45) Date of Patent: Jan. 16, 2018

(54) APPARATUS AND METHOD FOR CANCELLING SELF-INTERFERENCE SIGNAL IN RF FRONT END

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Jinmin Kim, Seoul (KR); Byung-Wook Min, Seoul (KR); Donghyun Lee, Gwacheon-si (KR); Jaehoon Chung, Seoul (KR); Kwangseok Noh, Seoul (KR)

(73) Assignees: LG ELECTRONICS INC., Seoul (KR); INDUSTRY-ACADEMIC COOPERATION DFOUNDATION, YONSEI UNIVERSITY, Seoul (KR)

( * ) Notice: Subject to any disclaimer, the term of this patent is extended or adjusted under 35 U.S.C. 154(b) by 259 days.

(21) Appl. No.: 14/715,293

(22) Filed: May 18, 2015

(65) Prior Publication Data
US 2016/0119110 A1 Apr. 28, 2016

Related U.S. Application Data

(60) Provisional application No. 62/066,906, filed on Oct. 22, 2014.

(30) Foreign Application Priority Data

Apr. 13, 2015 (KR) .................. 10-2015-0051635

(51) Int. Cl.
*H04L 5/14* (2006.01)
*H04B 1/12* (2006.01)

(52) U.S. Cl.
CPC ........... *H04L 5/1461* (2013.01); *H04B 1/123* (2013.01)

(58) Field of Classification Search
CPC ........ H04B 1/123; H04B 1/525; H04L 5/1461
USPC ........................................... 375/285
See application file for complete search history.

(56) References Cited

U.S. PATENT DOCUMENTS

| | | | |
|---|---|---|---|
| 2004/0242166 A1* | 12/2004 | Ikuma | H04B 1/44 455/78 |
| 2016/0056846 A1* | 2/2016 | Moher | H04B 1/0042 375/297 |
| 2016/0226653 A1* | 8/2016 | Bharadia | H04B 1/525 |

* cited by examiner

*Primary Examiner* — Michael Neff
(74) *Attorney, Agent, or Firm* — Lee, Hong, Degerman, Kang & Waimey

(57) ABSTRACT

The apparatus includes a transmission signal divider for dividing and transmitting a received signal to a transmission antenna and an attenuator, an attenuator for applying a predetermined attenuation factor to the transmitted signal divided to the attenuator, a phase shifter for phase-shifting the signal to which the attenuation factor is applied by a predetermined phase, and a time delayer for time-delaying the phase-shifted signal by a predetermined time.

7 Claims, 7 Drawing Sheets

- - - - time delay 1.63 nsec
·········· time delay 1.631 nsec
———— time delay 1.64 nsec

- - - - 359°
·········· no phase shifting
———— 9°

APPARATUS AND METHOD FOR CANCELLING SELF-INTERFERENCE SIGNAL IN RF FRONT END

Pursuant to 35 U.S.C. § 119(a), this application claims the benefit of earlier filing date and right of priority to Korean Patent Application No. 10-2015-0051635, filed on Apr. 13, 2015, which also claims the benefit of U.S. Provisional Application No. 62/066,906, filed on Oct. 22, 2014, the contents of which are all hereby incorporated by reference herein in their entirety.

BACKGROUND OF THE INVENTION

Field of the Invention

The present invention relates to wireless communication, and more particularly, to an apparatus and method for cancelling an apparatus and method for cancelling a self-interference signal in a radio frequency (RF) front end.

Discussion of the Related Art

A full duplex radio (FDR) or full duplex communication scheme refers to a communication scheme for simultaneously supporting transmission and reception using the same resource in one user equipment (UE). In this case, the same resource refers to the same time and the same frequency. FDR communication or full duplex communication is referred to as two-way communication.

Figure 1:
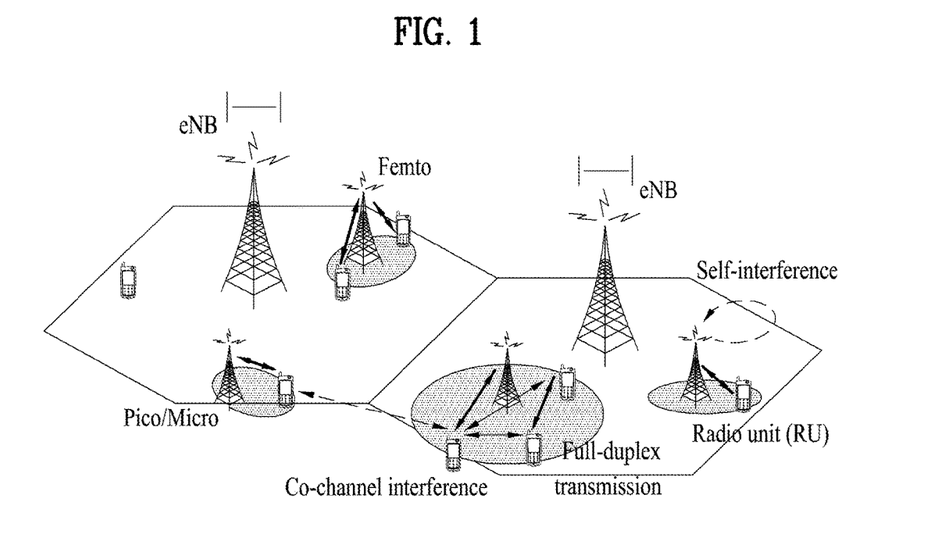
FIG. 1 is a diagram illustrating concept of a user equipment (UE) and a base station (BS), which support full duplex radio (FDR)

FIG. 1 is a diagram illustrating concept of a UE and a base station (BS), which support FDR. Referring to FIG. 1, in a network state that supports FDR, there are three types of interferences. First interference is intra-device self-interference. The intra-device self-interference refers to interference caused by signals that are transmitted from a transmission (Tx) antenna and received by a receiving (Rx) antenna in one BS or UE. Since the signals transmitted from the Tx antenna are transmitted with high power and a distance between the Tx antenna and the Rx antenna is small, the transmitted signals are received by the Rx antenna while attenuation is barely caused, and thus, are received with higher power than a desired signal. Second interference is UE to UE inter-link interference. In a network that supports FDR, the UE to UE inter-link interference is increasingly caused. The UE to UE inter-link interference refers to interference caused by uplink signals that are transmitted from a UE and received by an adjacently positioned UE. Third interference is BS to BS inter-link interference. Similarly, in a network state that supports FDR, BS to BS inter-link interference is increasingly caused. The BS to BS inter-link interference refers to interference caused by signals that are transmitted between BSs or heterogeneous BSs (pico, femto, and relay) in a HetNet state and received by an Rx antenna of another BS.

Among the three types of interferences, the intra-device self-interference (hereinafter, referred to as self-interference) is influence of interference caused only in FDR. In order to manage FDR, a most serious problem is cancellation of self-interference. However, methods for effectively cancelling self-interference in an FDR state at RF front end of user equipment have not been discussed in detail.

SUMMARY OF THE INVENTION

Accordingly, the present invention is directed to an apparatus and method for cancelling a self-interference signal in a radio frequency (RF) front end that substantially obviates one or more problems due to limitations and disadvantages of the related art.

An object of the present invention is to provide a method for cancelling a self-interference signal in a RF front end.

Another object of the present invention is to provide an apparatus for cancelling a self-interference signal in a RF front end.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for cancelling a self-interference signal in a radio frequency (RF) front end includes dividing and transmitting a received signal to a transmission antenna and an attenuator, applying a predetermined attenuation factor to a transmitted signal divided to the attenuator, phase-shifting the signal to which the attenuation factor is applied by as much as a predetermined phase, time-delaying the phase-shifted signal by a predetermined time, transmitting the time-delayed signal to a low noise amplifier (LNA) of a receiving end, and transmitting a residual signal to the LNA after subtracting a self-interference signal from a signal received from a receiving antenna. The predetermined attenuation factor may be a value determined in consideration of influence attenuated during a signal transmitted from the transmission antenna is received to the receiving antenna. The predetermined phase may be determined in such a way that the sum of the self-interference signal and the time-delayed signal is equal or less than a preset value. The predetermined time may be a value determined in consideration of time taken until a signal transmitted from the transmission antenna is received to the receiving antenna. The signal transmitted to the transmission antenna may correspond to a signal obtained by shifting a signal transmitted to the attenuator by a predetermined phase value.

In another aspect of the present invention, an apparatus for cancelling a self-interference signal at a radio frequency (RF) front end includes a transmission signal divider for dividing and transmitting a received signal to a transmission antenna and an attenuator, an attenuator for applying a predetermined attenuation factor to a transmitted signal divided to the attenuator, a phase shifter for phase-shifting the signal to which the attenuation factor is applied by a predetermined phase, and a time delayer for time-delaying the phase-shifted signal by a predetermined time. The apparatus may further include a receiving signal subtracter for subtracting a self-interference signal from a signal received from a receiving antenna. The receiving signal subtracter may correspond to a 90-degree directional coupler. The transmission signal divider may correspond to a 90-degree directional coupler. The predetermined attenuation factor may be a value determined in consideration of influence attenuated during a signal transmitted from the transmission antenna is received to the receiving antenna. The predetermined phase may be determined in such a way that the sum of the self-interference signal and the time-delayed signal is equal or less than a preset value. The predetermined time may be a value determined in consideration of time taken until a signal transmitted from the transmission antenna is received to the receiving antenna.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, access point (AP), etc. Throughout this specification, the technical features of the present invention are described based on an institute of electrical and electronic engineers (IEEE) 802.16 system, but may be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

Figure 2:
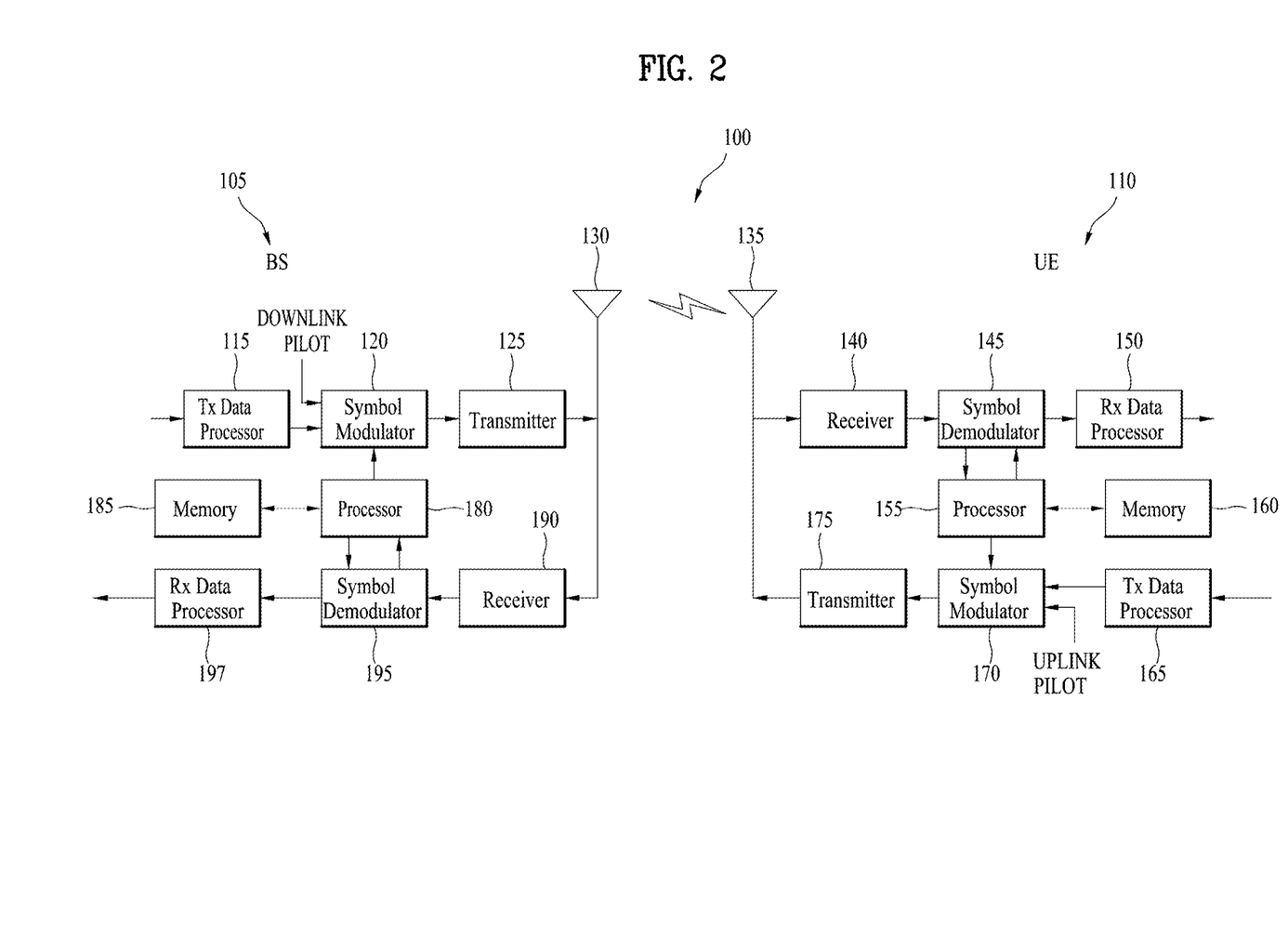
FIG. 2 is a block diagram illustrating a structure of a base station (BS) and a UE in a wireless communication system.

FIG. 2 is a block diagram illustrating a structure of a base station (BS) 105 and a user equipment (UE) 110 in a wireless communication system 100.

Although one BS 105 and one UE 110 (including a D2D UE) are illustrated in order to simply illustrating the wireless communication system 100, the wireless communication system 100 may include one or more BSs and/or one or more UEs.

Referring to FIG. 2, the BS 105 may include a transmission (Tx) data processor 115, a symbol modulator 120, a transmitter 125, a Tx/Rx antenna 130, a processor 180, a memory 185, a receiver 190, a symbol demodulator 195, and a reception (Rx) data processor 197. In addition, the UE 110 may include a Tx data processor 165, a symbol demodulator 170, a transmitter 175, a Tx/Rx antenna 135, a processor 155, a memory 160, a receiver 140, a symbol demodulator 145, and an Rx data processor 150. Although FIG. 2 illustrates that each of the BS 105 and the UE 110 includes the Tx/Rx antennas 130 and 135, respectively, each the BS 105 and the UE 110 includes a plurality of Tx/Rx antennas. Accordingly, the BS 105 and the UE 110 according to the present invention support a multiple input multiple output (MIMO) system. In addition, the BS 105 according to the present invention may support both single user-MIMO (SU-MIMO) and multi user-MIMO (MU-MIMO) schemes.

In downlink, the Tx data processor 115 receives traffic data, formats and codes the received traffic data, and interleaves and modulates (or symbol-maps) the coded traffic data to provide modulated symbols ("data symbols"). The symbol modulator 120 receives and processes the data symbols and pilot symbols to provide a stream of symbols.

The symbol modulator 120 multiplexes the data and pilot symbols and transmits the multiplexed data and pilot symbols to the transmitter 125. In this case, each transmitted symbol may be a data symbol, a pilot symbol, or a zero signal value. In each symbol period, pilot symbols may be consecutively transmitted. The pilot symbols may each be a frequency division multiplexing (FDM) symbol, an orthogonal frequency division multiplexing (OFDM) symbol, a time division multiplexing (TDM) symbol, or a code division multiplexing (CDM) symbol.

The transmitter 125 receives the stream of symbols, converts the stream into one or more analog signals, and further adjusts (e.g., amplifies, filters, and frequency-upconverts) the analog signals to generate a downlink signal appropriate for transmission via a radio channel. Then the Tx antenna 130 transmits the generated downlink signal to the UE 110.

In the structure of the UE 110, the Rx antenna 135 receives the downlink signal from the BS 105 and provides the received signal to the receiver 140. The receiver 140 adjusts (e.g., filters, amplifies, and frequency-downconverts) the received signal and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, data-demodulates the received data symbols to acquires data symbol estimated values (which is estimated values of the transmitted data symbols), and provides the data symbol estimated values to the Rx data processor 150. The Rx data processor 150 demodulates (i.e., symbol-demaps), deinterleaves, and decodes the data symbol estimated values to recover the transmitted traffic data.

Processing operations by the symbol demodulator 145 and the Rx data processor 150 are complementary to processing operations of the symbol modulator 120 and the Tx data processor 115 in the BS 105, respectively.

In uplink, the Tx data processor 165 of the UE 110 processes traffic data to provide data symbols. The symbol demodulator 170 may receive and modulate the data symbols and provide a stream of the symbols to the transmitter 175. The transmitter 175 receives and processes the stream of symbols to generate an uplink signal. In addition, the Rx antenna 135 transmits the generate uplink signal to the BS 105.

In the BS 105, an uplink signal from the UE 110 is received by the Rx antenna 130, and the receiver 190 processes the received uplink signal to acquire samples. Then the symbol demodulator 195 processes the samples to provide pilot symbols and data symbol estimated values which are received for downlink. The reception (Rx) data processor 197 processes the data symbol estimated values to recover the traffic data transmitted from the UE 110.

The processors 155 and 180 of the UE 110 and the BS 105 order (e.g., controls, manipulates, manages, etc.) operations of the UE 110 and the BS 105, respectively. The processors 155 and 180 may be respectively connected to the memories 160 and 185 which store program codes and data. The memories 160 and 185 are respectively connected to the processors 155 and 180 and store an operating system, application, and general files.

The processors 155 and 180 may be referred to as a controller, a microcontroller, a microprocessor, a microcomputer, or the like. The processors 155 and 180 may each be embodied by hardware, firmware, software, or a combination thereof. When an embodiment of the present invention is embodied by hardware, the processors 155 and 180 may include application specific integrated circuits (ASICs), digital signal processors (DSPs), digital signal processing devices (DSPDs), programmable logic devices (PLDs), field programmable gate arrays (FPGAs), or the like which is configured to execute the present invention.

When an embodiment of the present invention is embodied by firmware or software, firmware or software may be configured in the form of a module, a procedure, a function, etc. which perform function or operations according to the present invention. Firmware or software configured to implement the present invention may be included in the processors 155 and 180 or stored in the memories 160 and 185 and driven by the processors 155 and 180.

Layers of a wireless interface protocol between wireless communication systems (network) of the UE 110 and the BS 105 may be classified into a first layer L1, a second layer L2, and a third layer L3 based on three lower layers of an open system interconnection (OSI) model that is well known in a communication system. A physical layer belongs to the first layer L1 and provides an information transfer service through a physical channel. A radio resource control (RRC) layer belongs to the third layer (L3) and provides control radio resources between the UE 110 and a network. The UE 110 and the BS 105 may exchange RRC messages through a wireless communication network and an RRC layer.

Throughout this specification, the processor 155 of the UE 110 and the processor 180 of the BS 105 perform an operation for processing signals and data except for a function of receiving or transmitting signals by the UE 110 and the BS 105 or a storing function. However, hereinafter, for convenience of description, the processors 155 and 180 will not be specially stated. Unless the processors 155 and 180 are not stated, a series of operations such as data processing but not the function of transmitting or receiving signals and the storing function may be performed.

The present invention relates to technology for cancelling a self-interference signal used in full duplex radio (FDR) and proposes an apparatus for cancelling a self-interference signal, which can be used in any FDR RF front-end structure.

Figure 3:
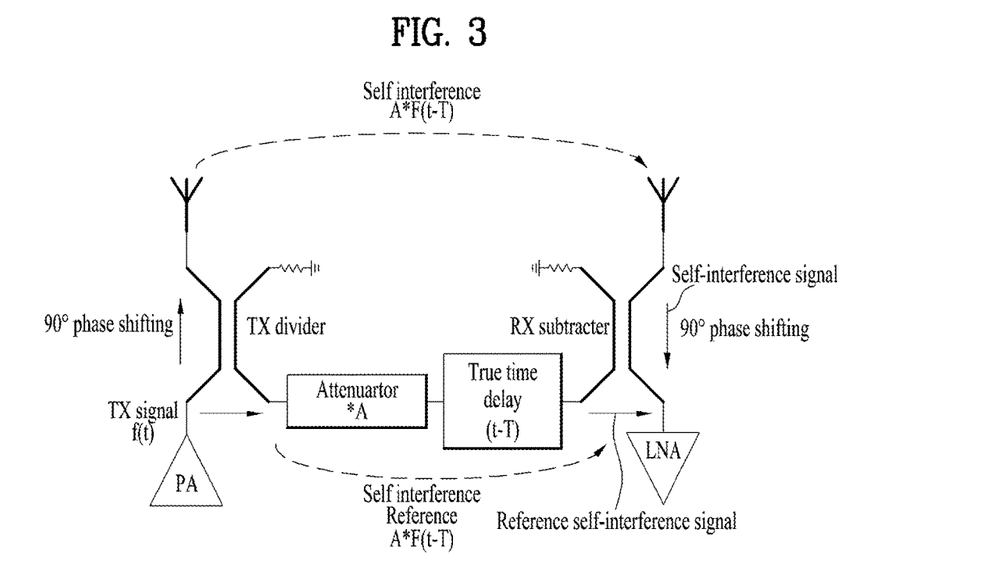
FIG. 3 is a diagram for explanation of an existing reference self-interference signal generator of a user equipment and concept of cancellation of a self-interference signal.

FIG. 3 is a diagram for explanation of an existing reference self-interference signal generator of a user equipment and concept of cancellation of a self-interference signal.

Referring to FIG. 3, an RF front-end structure may include a power amplifier (PA), a Tx divider, and a Tx antenna of a transmitter, and a receiving antenna, an Rx subtracter, and a low noise amplifier (LNA) of a receiver, and may include an attenuator and a true time delayer. A left portion of FIG. 3 illustrates the Tx antenna for transmitting a signal at the transmitter and a right portion of FIG. 3 illustrates the Rx antenna for receiving a signal at the receiver.

FIG. 3 illustrates a method in which the same signal as in a self-interference channel is formed and a self-interference signal is cancelled before a low noise amplifier (LNA) of a receiver in order to cancel a self-interference signal in an existing FDR RF front-end structure.

FIG. 3 illustrates an example of an analog cancellation scheme for cancellation of a self-interference signal. According to the analog cancellation scheme, a signal output from a transmitter is divided through a Tx divider device, and the same signal as a self-interference signal is formed using a true time delay circuit (or a true time delayer) for reflection of time taken to receive a signal transmitted from the Tx antenna to the Rx antenna and an attenuator for reflection of influence attenuated during reception of the signal transmitted from the Tx antenna to the Rx antenna and then is subtracted by the receiver before a low noise amplifier (LNA).

In FIG. 3, an apparatus for dividing a transmitted signal by a Tx divider before a power amplifier (PA) or combining a signal with a received signal+a self-interference signal before the LNA may be changed for each structure, but the same technology as the aforementioned self-interference signal cancellation technology at an RF end may be used.

In FIG. 3, the Tx divider is used to transmit a signal acquired by taking a portion of the Tx signal transmitted from the PA to a reference self-interference signal generator and uses a 90-degree directional coupler. The Rx subtracter is used to subtract a self-interference signal from the received signal and self-interference signal transmitted to the Rx antenna and also uses a 90-degree directional coupler. Accordingly, the self-interference signal and the reference self-interference signal have a difference of 180 degrees in phase before the LNA and thus are offset. In this case, as shown in FIG. 3, when the self-interference signal is modeled with an attenuation factor A and time delay of T, a reference self-interference signal generator needs to include an attenuator and a true time delay circuit and to form the same attenuation and time delay as in a self-interference channel.

A balun for making 180 degrees as a phase difference between a signal transmitted to the Tx antenna from the PA and a signal transmitted to a reference self-interference signal generator may be used as a Tx divider, and in this case, the Rx subtracter needs a power combiner (or a power divider) with no phase difference between two inputs and an output.

It is difficult to make a phase difference of complete 90 degrees by a 90-degree directional coupler used as the existing Tx divider or the Rx subtracter, and thus it is difficult to make a phase difference between the self-interference signal and the reference self-interference signal as complete 180 degrees. When the self-interference signal and reference self-interference signal do not have a phase difference of complete 180 degrees, self-interference signal cancellation performance is inevitably degraded. In reality, when the balun is used, it is disadvantageous that phase imbalance between outputs based on a common chip balun provides performance of about 180±5 degrees and cannot be randomly controlled. In addition, the self-interference signal is not simply modeled with attenuation A and time delay T. When time delay of the self-interference signal is constant to T in all transmit frequencies, this means that a phase of the self-interference signal is linearly delayed according to a frequency, and a phase of an actual self-interference signal is not modeled as such. In addition, resolution of the true time delay circuit included in the reference self-interference signal generator needs to be very high.

In order to overcome these existing problems, the present invention proposes an apparatus and method for cancelling a self-interference signal by adding a phase shift circuit (or a phase shifter) to an existing reference self-interference signal generator including an attenuator and a true time delay circuit.

Figure 4:
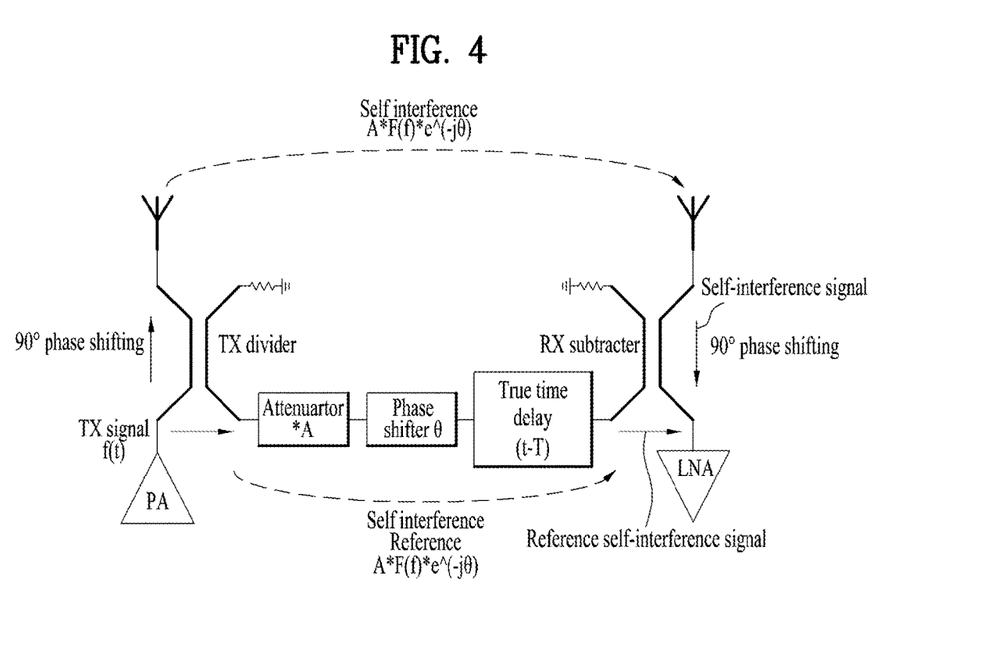
FIG. 4 is a diagram illustrating an RF front-end structure of a UE for cancelling a self-interference signal according to the present invention.

FIG. 4 is a diagram illustrating an RF front-end structure of a UE for cancelling a self-interference signal according to the present invention.

It is difficult to make a phase difference of complete 90 degrees by a 90-degree directional coupler used as a Tx divider or an RX subtracter, and thus it is difficult to make a phase difference between the self-interference signal and the reference self-interference signal as complete 180 degrees. To this end, as illustrated in FIG. 4, it may be considered to add a phase shift circuit (or a phase shifter) to a reference self-interference signal generator including an attenuator and a true time delay circuit. The true time delay circuit refers to a circuit for moving a signal in parallel over all time viewed from the time domain. The true time delay circuit refers to a circuit for linearly moving (changing inclination of frequency versus phase) a phase of a signal over frequency viewed from the frequency domain. The phase shifter refers to a circuit for moving a phase of a signal in parallel in all frequency viewed from the frequency domain.

In FIG. 4, a phase shift circuit is positioned between an attenuator and a true time delay circuit, applies attenuation to a signal transmitted from a Tx divider to cause phase delay, applies time delay to the phase-delayed signal, and then transmits the signal to a receiver. However, the position of the phase shift circuit is not limited thereto. As such, a phase delay value for application of phase delay may be determined in such a way that the sum of a self-interference signal and a reference self-interference signal to which the phase delay value is applied is equal or less than a predetermined value (e.g., −30 dB).

Figure 5:
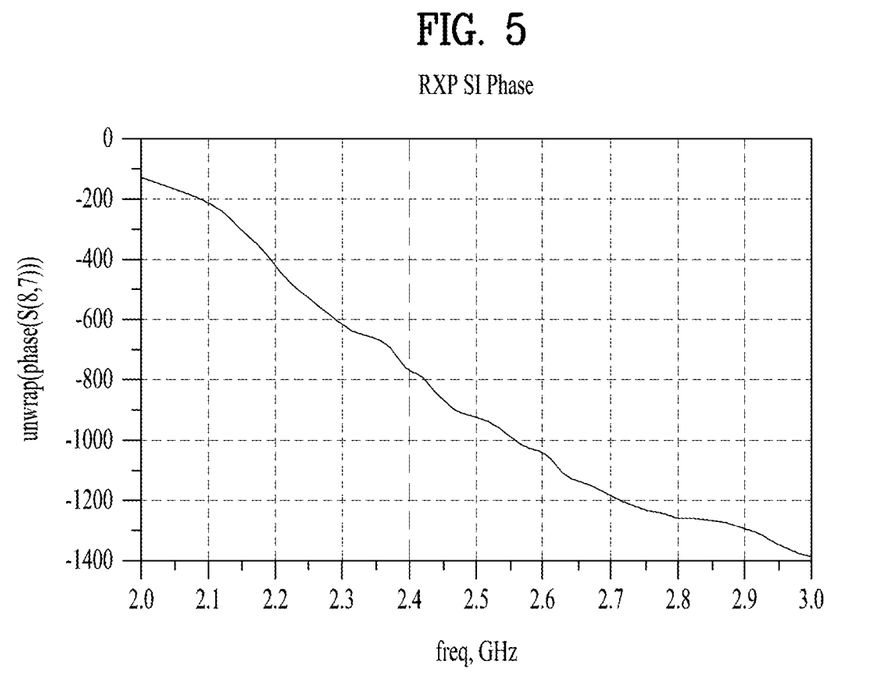
FIG. 5 is a graph showing a phase of a self-interference signal according to a frequency.

FIG. 5 is a graph showing a phase of a self-interference signal according to a frequency.

As shown in FIG. 5, the phase of the self-interference signal is not linearly changed according to a frequency. The true time delay circuit can make only linear phase shift according to a frequency and cannot make the same phase shift as that of the self-interference signal, and accordingly, a controllable phase shift circuit (a phase shifter) may be added so as to reduce burden of resolution for a true time delay circuit for high self-interference signal cancellation performance and to more accurately model the self-interference signal.

Figure 6:
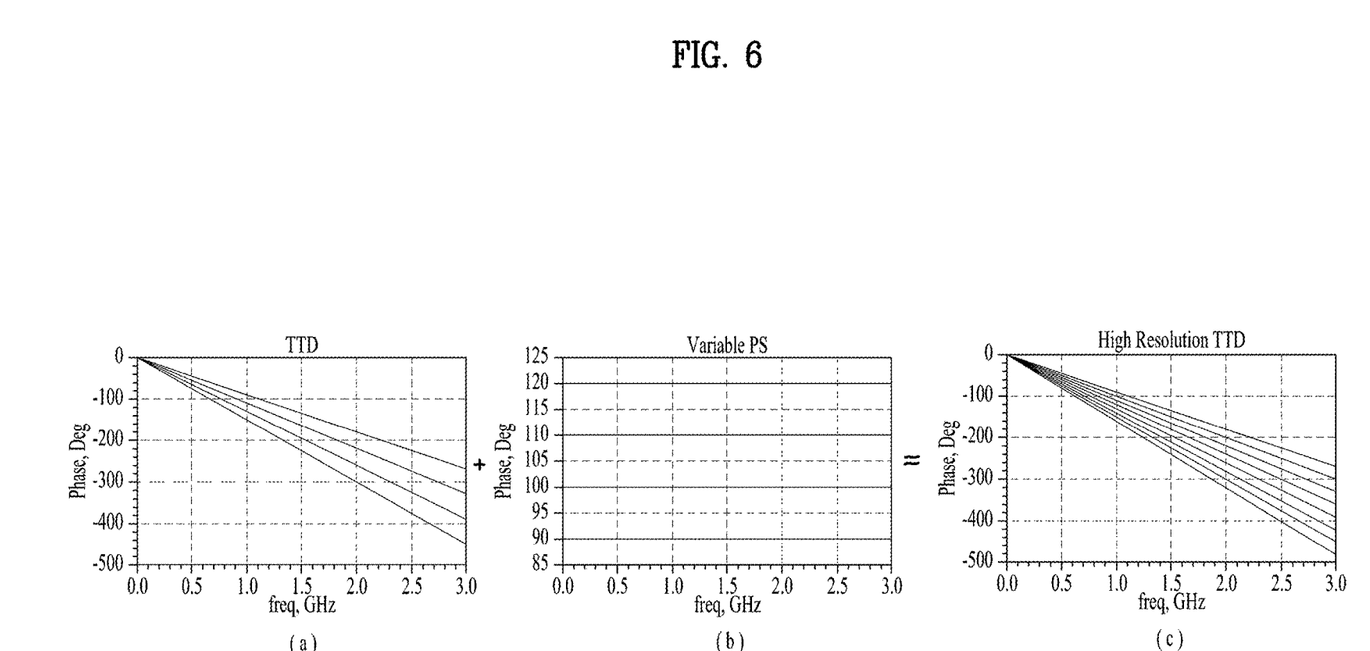
FIG. 6 is a diagram illustrating frequency phase shift according to a combination of a true time delay circuit and a phase shift circuit like in an RF front-end structure of the UE illustrated in FIG. 4.

FIG. 6 is a diagram illustrating frequency phase shift according to a combination of a true time delay circuit and a phase shift circuit like in an RF front-end structure of the UE illustrated in FIG. 4.

Referring to FIG. 6, phase shift of a true time delay circuit ((c) of FIG. 6) having high resolution can be made with a combination of a true time delay circuit ((a) of FIG. 6) and a phase shift circuit ((b) of FIG. 6) having low resolution in an actually determined bandwidth.

When a phase shift circuit is added to a reference self-interference signal generator, all the three conventional problems can be overcome. With regard to a first problem, phase imbalance caused by an apparatus used as a Tx divider or an Rx subtracter can be overcome, and with regard to a second problem, non-linear phase shift according to a frequency of a self-interference signal can be primarily modeled. With regard to a third problem, when a phase shift circuit is added, a burden of high resolution for a true time delay circuit can be reduced.

Figure 7:
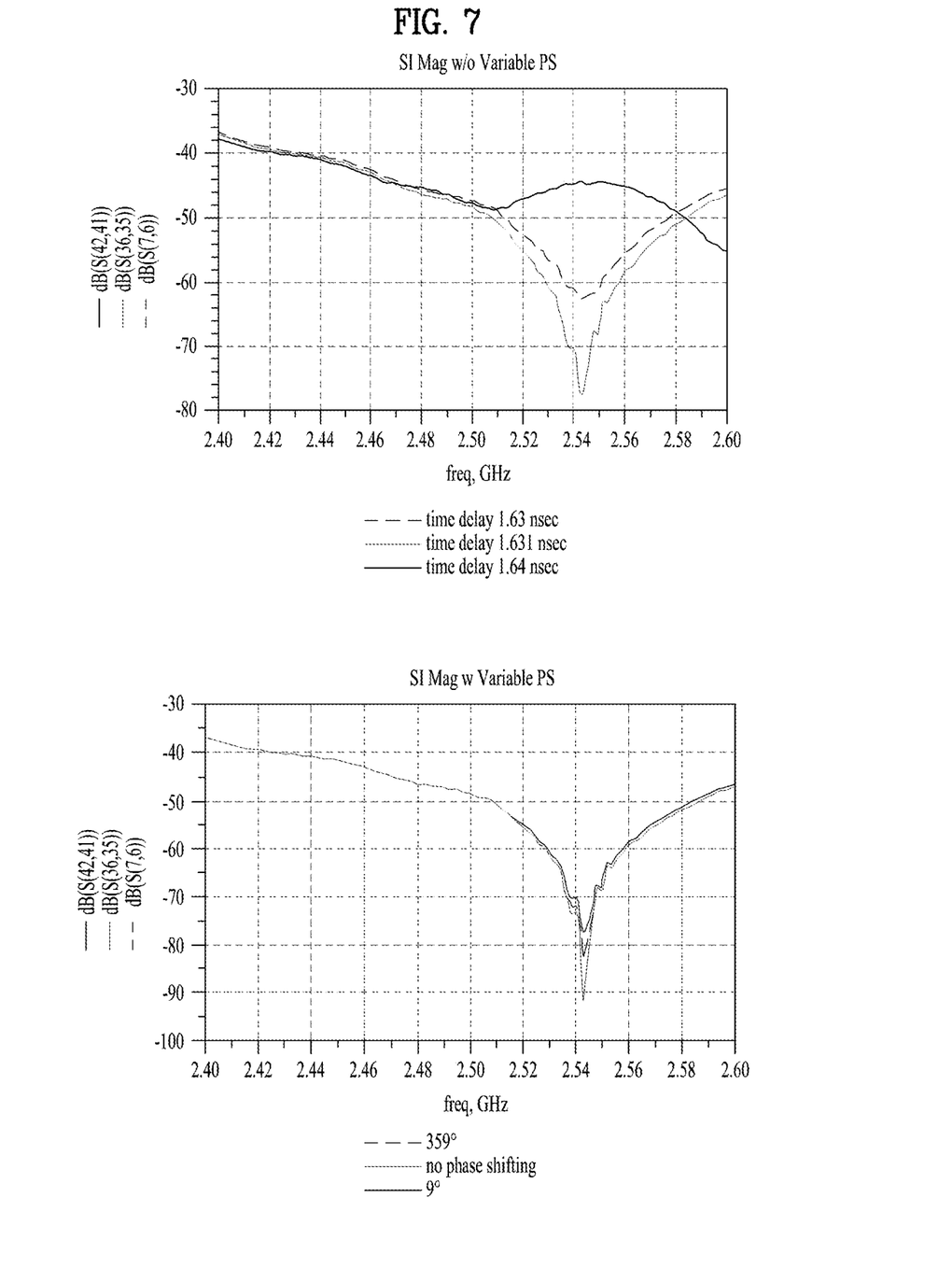
FIG. 7 is a diagram illustrating resolution (a) required for a true time delay circuit and self-interference signal cancellation performance (b) when a phase shift circuit is added.

FIG. 7 is a diagram illustrating resolution (a) required for a true time delay circuit and self-interference signal cancellation performance (b) when a phase shift circuit is added.

FIG. 7 shows a change degree of self-interference signal cancellation performance when time delay is changed, compared with an optimum (a solid line plot) when there is no phase shift circuit and also shows the same self-interference signal cancellation performance as in the optimum state can be ensured by controlling the phase shift circuit.

As seen from FIG. 7, self-interference signal cancellation performance is reduced by as much as about 10 dB even when time delay is changed by only 1 psec compared with the optimum state, which means that resolution of a true time delay circuit of a structure according to conventional technology needs to be within at least 1 psec. However, as seen from FIG. 7(b), according to the present invention, when a phase shift circuit is added to compensate for phase shift to 359 degrees, optimum self-interference signal cancellation performance can be re-achieved.

Determination of a phase value (θ or φ) to be applied by a phase shift circuit in the above FIG. 4 will be described below. For example, it is assumed that magnitude of self-interference signal=A, time delay of self-interference signal=$t_{SI}$, time delay of reference self-interference signal=$t_{REF}$, and phase value of reference self-interference signal=φ.

Thus, the self-interference signal and the reference self-interference signal may be represented in the frequency domain as follows.

Self-interference (SI) signal=$A^*\exp??-j?t_{SI})$

Reference self-interference signal=$A^*\exp??-j(?t_{REF}+?))$

Sum of self-interference signal and reference self-interference signal=$A^*\exp(-j\omega t_{SI})+A^*\exp(-j(\omega t_{REF}+\varphi))$ When resolution of a true time delay circuit of a reference self-interference signal (SI) reference generator is deficient and $t_{SI}\neq t_{REF}$, a desired frequency $?_c$ may be adjusted to φ to a sum signal of the self-interference signal and the reference self-interference signal is cancelled by −30 dB in a narrow band. In this case, required ψ may be represented as follows.

φ=ω$_c(t_{SI}-t_{REF})-\pi$

A bandwidth for achieving self-interference signal cancellation (SIC) to −30 dB or more may be obtained by solving Formula 1 below for ω.

$A^*\exp(-j\omega t_{SI})+A^*\exp(-j(\omega t_{REF}+\varphi)))<A^*10^{-2}$ [Formula 1]

Figure 8:
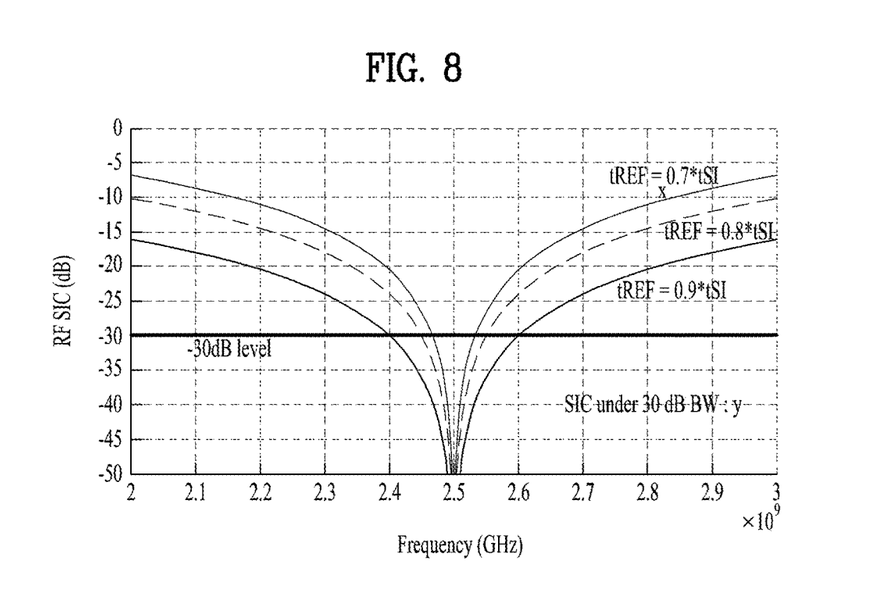
FIG. 8 is a diagram illustrating self-interference signal cancellation (SIC) vs frequency when a self-interference signal and a reference self-interference signal having the same amplitude and different delays are set to be shifted in phase to cause maximum SIC at 2.5 GHz.

FIG. 8 is a diagram illustrating self-interference signal cancellation (SIC) vs frequency when a self-interference signal and a reference self-interference signal having the same amplitude and different delays are set to be shifted in phase to cause maximum SIC at 2.5 GHz.

In FIG. 8, for example, when κ$_c$=2.5 GHz, $t_{SI}$=1 nsec, $t_{REF}$=0.7, 0.8, 0.9 nsec required phase shift φ=270°, 0°, 90°, and in this case, self-interference signal cancellation (SIC) magnitude is theoretically as follows. Bandwidths equal or greater than SIC 30 dB are 2.466-2.533 GHz=66 MHz, 2.45-2.55 GHz=100 MHz, and 2.4-2.6 GHz=200 MHz, respectively. In FIG. 8, a vertical axis represents SIC magnitude (dB) and a horizontal axis represents frequency $?_c$.

Figure 9:
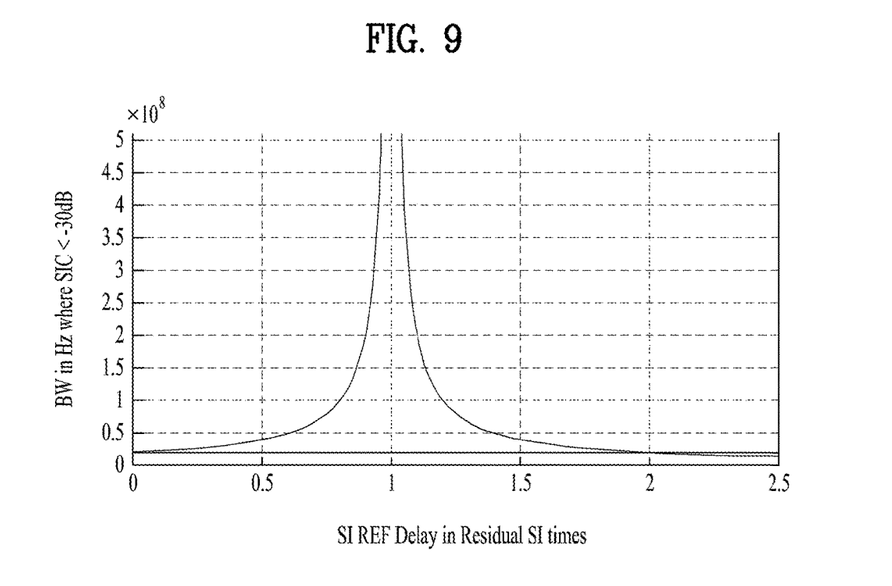
FIG. 9 shows a graph of a BW with SIC<−30 dB when $\omega_c$=2.5 GHz, $t_{SI}$=1 nsec, SI REF delay is changed, and a phase shifter is readjusted so as to maximize SIC at $\omega_c$.

FIG. 9 shows a graph of a BW with SIC<−30 dB when ω$_c$=2.5 GHz, $t_{SI}$=1 nsec, SI REF delay is changed, and a phase shifter is readjusted so as to maximize SIC at ω$_c$.

According to the embodiments of the present invention, resolution of a time delay circuit in an RF front end can be reduced and simultaneously a self-interference signal can be effectively cancelled.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for cancelling a self-interference signal at a radio frequency (RF) front end of an apparatus, the method comprising:

transmitting received signals to a transmission antenna and an attenuator;

applying a predetermined attenuation factor to a signal input to the attenuator;

phase-shifting by a predetermined phase the signal to which the attenuation factor is applied;

time-delaying the phase-shifted signal by a predetermined time;

transmitting the time-delayed signal to a low noise amplifier (LNA) of a receiving end;

subtracting the time-delayed signal from a received signal; and transmitting a residual signal from the subtraction to the LNA, wherein the predetermined phase is determined such that a sum of the self-interference signal and the time-delayed signal is equal to or less than a preset value.

2. The method according to claim 1, wherein the predetermined attenuation factor is determined in consideration of attenuation of the received signal during transmission from the transmission antenna to a reception antenna.

3. The method according to claim 1, wherein the predetermined time is determined in consideration of transmission time from the transmission antenna to a reception antenna of the received signal.

4. An apparatus for cancelling a self-interference signal at a radio frequency (RF) front end, the apparatus comprising:

a transmitter for transmitting received signals to a transmission antenna and an attenuator;

the attenuator for applying a predetermined attenuation factor to a signal that is received;

a phase shifter for phase-shifting by a predetermined phase the signal to which the attenuation factor is applied;

a time-delayer for time-delaying the phase-shifted signal by predetermined time; and a subtracter for subtracting the time-delayed signal from a received signal, wherein the transmitter is further for transmitting the time-delayed signal to a low noise amplifier (LNA) of a receiving end, wherein the transmitter is further for transmitting a residual signal from the subtraction to the LNA, and wherein the predetermined phase is determined such that a sum of the self-interference signal and the time-delayed signal is equal to or less than a preset value.

5. The apparatus according to claim 4, wherein the subtracter comprises a 90-degree directional coupler.

6. The apparatus according to claim 4, wherein the predetermined attenuation factor is determined in consideration of attenuation of the received signal during transmission from the transmission antenna to a reception antenna.

7. The apparatus according to claim 4, wherein the predetermined time is determined in consideration of transmission time from the transmission antenna to a reception antenna of the received signal.

\* \* \* \* \*